United States Patent [19]

Watt et al.

[11] 4,012,489

[45] Mar. 15, 1977

[54] PROCESS FOR THE PREPARATION OF URANIUM DIOXIDE

[75] Inventors: George W. Watt, Austin, Tex.; Daniel W. Baugh, Jr., Baton Rouge, La.

[73] Assignee: Exxon Nuclear Company Inc., Bellevue, Wash.

[22] Filed: May 21, 1975

[21] Appl. No.: 579,494

[52] U.S. Cl. .............................. 423/261; 423/250; 423/251; 423/253

[51] Int. Cl.$^2$ ........................................ C01G 43/02

[58] Field of Search ........... 423/250, 251, 261, 253

[56] References Cited

UNITED STATES PATENTS

| | | | |
|---|---|---|---|
| 2,536,347 | 1/1951 | Brimm et al. | 423/253 |
| 2,864,665 | 12/1958 | Miller et al. | 423/251 X |
| 3,149,908 | 9/1964 | La Chapelle | 423/250 |
| 3,154,375 | 10/1964 | Cefola | 423/253 X |
| 3,239,307 | 3/1966 | Reusser | 423/261 X |
| 3,725,293 | 4/1973 | Haas | 423/251 X |

*Primary Examiner*—Edward A. Miller
*Attorney, Agent, or Firm*—Jack Matalon

[57] ABSTRACT

An actinide dioxide, e.g., uranium dioxide, plutonium dioxide, neptunium dioxide, etc., is prepared by reacting the actinide nitrate hexahydrate with sodium dithionite as a first step; the reaction product from this first step is a novel composition of matter comprising the actinide sulfite tetrahydrate. The reaction product resulting from this first step is then converted to the actinide dioxide by heating it in the absence of an oxygen-containing atmosphere (e.g., nitrogen) to a temperature of about 500° to about 950° C. for about 15 to about 135 minutes. If the reaction product resulting from the first step is, prior to carrying out the second heating step, exposed to an oxygen-containing atmosphere such as air, the resultant product is a novel composition of matter comprising the actinide oxysulfite tetrahydrate which can also be readily converted to the actinide dioxide by heating it in the absence of an oxygen-containing atmosphere (e.g., nitrogen) at a temperature of about 400° to about 900° C. for about 30 to about 150 minutes. Further, the actinide oxysulfite tetrahydrate can be partially dehydrated at reduced pressures (and in the presence of a suitable dehydrating agent such as phosphorus pentoxide). The partially dehydrated product may be readily converted to the dioxide form by heating it in the absence of an oxygen-containing atmosphere (e.g., nitrogen) at a temperature of about 500° to about 900° C. for about 30 to about 150 minutes.

16 Claims, No Drawings

PROCESS FOR THE PREPARATION OF URANIUM DIOXIDE

BACKGROUND OF THE INVENTION

This invention relates to a process for the preparation of uranium dioxide as well as to certain novel compositions of matter resulting from this process. Those concerned with the production of nuclear fuel have been constantly searching for processes for the production of actinide dioxides such as plutonium dioxide, neptunium dioxide and uranium dioxide which are cheaper, less complex, result in the production of the actinide dioxide in a pure state and further result in the production of ceramically active forms of the actinide dioxide (i.e., the physical form of the actinide dioxide must be such as to permit sintering thereof which is a necessary step in the preparation of pellets for use in nuclear fuel rods.

The present invention accomplishes all of the results set forth above by a process which permits the direct conversion of the actinide nitrate hexahydrate to uranium dioxide. An actinide nitrate hexahydrate such as uranyl nitrate hexahydrate is available commercially and is commonly produced during the process in which uranium is extracted from the ores, converted by a series of steps ultimately to "yellow cake" which consists principally of $UO_3$, other oxides of uranium, and associated impurities. Following purification, usually by appropriate solvent extraction processes, the last step involves extraction of the uranium from an organic solvent into nitric acid solution; from this solution, pure uranyl nitrate hexahydrate is separated as a solid. This product is calcined to yield $UO_3$, which is reduced to $UO_2$ and thereafter fluorinated in two steps to obtain uranium hexafluoride. The uranium hexafluoride in turn is purified by successive distillations so as to yield a product with impurities in the parts per million range and the purified uranium hexafluoride may then be used in isotope enrichment processes, reduced with calcium to provide uranium metal of sufficient purity for use in the production of "weapons grade" plutonium or subjected to further purifications to result in the production of uranium dioxide in a degree of purity suitable for use as fuel for nuclear power reactors.

The present invention eliminates the need for many of the complex purification steps which would otherwise be required after uranium has been extracted from ores and has been converted to uranyl nitrate hexahydrate. If plutonium dioxide is available as the "enriched" fuel, the uranium dioxide produced by the present process may be admixed with the plutonium dioxide and thereafter used for nuclear fuel rods. Alternatively, only a small fraction of the enormous quantities of uranium hexafluoride presently processed need be purified and subsequently enriched in the $U^{235}$ isotope (in the form of $U^{235}F_6$ which is then converted to $U^{235}O_2$) and the bulk of the $U^{238}O_2$ required for nuclear fuel materials may be made by the process of this invention and thereafter admixed with the enriched $U^{235}O_2$ material to obtain a blend suitable for use as pellets in nuclear fuel rods.

In recent years, efforts have been made to reduce the complexity of processes for the production of uranium dioxide in order to reduce fuel costs. For example, J. Belle ("Uranium Dioxide: Properties and Nuclear Applications," USAEC, 1961) atomized a solution of uranyl nitrate hexahydrate in the high temperature reducing atmosphere of a flame to produce uranium dioxide; however, this process provided no selectivity of reaction and impurity levels in the final product were essentially the same as in the feed liquor. Researchers at the Argonne National Laboratory, in 1963, converted $UF_6$ directly to $UO_2$ by a high temperature gas phase reaction of $UF_6$ with $H_2O$ and $H_2$, but the resultant product still contained intolerable fluoride ion levels. In 1962, R. S. Wilkes (J. Nucl. Mat., vol. 7, page 157 (1962)) prepared uranium dioxide by electrolysis of a solution of uranyl chloride ($UO_2Cl_2$) in a molten salt bath, but the resultant product contained higher oxide impurities.

SUMMARY OF THE PRESENT INVENTION

This invention, which relates to new process techniques and certain new compositions of matter, utilizes an actinide nitrate hexahydrate as the starting material. Preferably, the actinide is uranium, plutonium or neptunium. For illustrative purposes, uranyl nitrate hexahydrate, $UO_2(NO_3)_2 \cdot 6H_2O$ (hereinafter referred to for the sake of brevity as "UNH") is utilized as the starting material. This invention may be summarized by means of the following reactions:

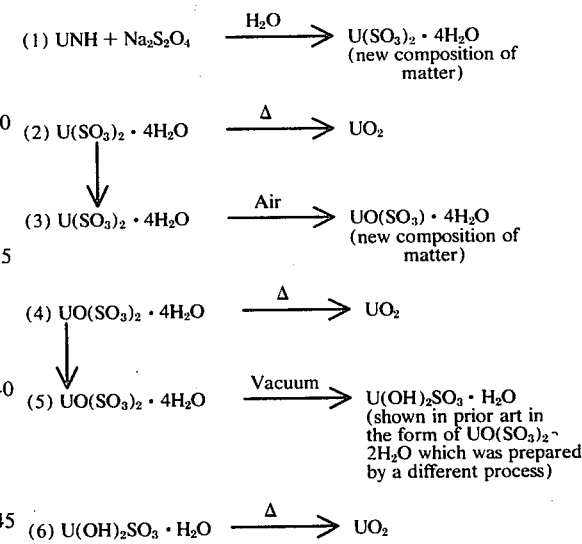

(1) $UNH + Na_2S_2O_4 \xrightarrow{H_2O} U(SO_3)_2 \cdot 4H_2O$ (new composition of matter)

(2) $U(SO_3)_2 \cdot 4H_2O \xrightarrow{\Delta} UO_2$ (3) $U(SO_3)_2 \cdot 4H_2O \xrightarrow{Air} UO(SO_3) \cdot 4H_2O$ (new composition of matter)

(4) $UO(SO_3)_2 \cdot 4H_2O \xrightarrow{\Delta} UO_2$ (5) $UO(SO_3)_2 \cdot 4H_2O \xrightarrow{Vacuum} U(OH)_2SO_3 \cdot H_2O$ (shown in prior art in the form of $UO(SO_3)_2 \cdot 2H_2O$ which was prepared by a different process)

(6) $U(OH)_2SO_3 \cdot H_2O \xrightarrow{\Delta} UO_2$

DETAILS OF THE PRESENT INVENTION

As may be seen from the reactions set forth above, the present invention for the preparation of actinide dioxides such as uranium dioxide proceeds from the reaction of an actinide nitrate hexahydrate such as UNH with $Na_2S_2O_4$ (sodium dithionite) to obtain $U(SO_3)_2 \cdot 4H_2O$, i.e., uranium(IV) sulfite tetrahydrate. The uranium(IV) sulfite tetrahydrate is a new composition of matter. It in turn may be converted directly to uranium dioxide by heating the material in the absence of oxygen or alternatively it may be converted to uranium(IV) oxysulfite tetrahydrate by exposing it to air. The uranium(IV) oxysulfite tetrahydrate is a new composition of matter. The uranium(IV) oxysulfite tetrahydrate in turn may be converted to uranium dioxide by heating it in the absence of oxygen or alternatively, it may be partially dehydrated at reduced pressures to yield $U(OH)_2SO_3 \cdot H_2O$, i.e., uranium(IV) dihydroxysulfite monohydrate. This latter material which is not a new composition of matter but has been shown in the prior art in the form of $UO(SO_3)_2 \cdot 2H_2O$ prepared by a different process. This latter material may subsequently be converted to uranium dioxide by heating it in the absence of oxygen.

REACTION OF UNH WITH SODIUM DITHIONITE

An actinide nitrate hexahydrate such as UNH was utilized. UNH was obtained from Fisher Scientific Co. in the "chemically pure grade"; the total concentration of alkali and alkaline earth metals of the UNH, expressed as sulfates, was 0.1 percent. The sodium dithionite powder was obtained from the J. T. Baker Chemical Co. as a "purified" form. As a general procedure, the molar ratio of sodium dithionite to uranyl nitrate hexahydrate ranges from about 1 to about 10 moles, preferably 1 to 4 moles of the sodium dithionite per mole of uranyl nitrate hexahydrate. The sodium dithionite, present in the form of about 1 to about 20 percent, preferably 1 to 10 percent solution in water is added with stirring to a solution of about 1 to about 20 percent, preferably 1 to 10 percent of UNH in water. Upon stirring, a deep red color is developed which rapidly results in a pale green precipitate. After addition of the sodium dithionite solution is completed, stirring is continued for about ten minutes and the resultant precipitate is filtered in an atmosphere which contains no oxygen (e.g., nitrogen, argon, helium, etc.). The filtered precipitate may then be washed in accordance with usual techniques, e.g., with water and subsequently with ethyl alcohol and may thereafter be dried by drawing a dry oxygen-free gas (e.g., nitrogen) through the filter cake. The yield is essentially quantitative.

The resultant uranium(IV) sulfite tetrahydrate (a new composition of matter) was found to be insoluble in water, all common organic solvents and reacted only slowly in boiling aqua regia. In concentrated sulfuric acid, the product only darkened in color; however, the product was very soluble in 10 percent sulfuric acid.

THERMAL DECOMPOSITION OF URANIUM(IV) SULFITE TETRAHYDRATE

Uranium(IV) sulfite tetrahydrate may be readily thermally decomposed to yield (substantially quantitatively) uranium dioxide in a highly purified state by merely heating the uranium(IV) sulfite tetrahydrate in the absence of an oxygen-containing atmosphere (e.g., an atmosphere consisting of nitrogen, argon, helium, etc.) at a temperature in the range of about 500° to about 950° C., preferably 650° to 750° C. for about 15 to 135 minutes, preferably 50 to 100 minutes.

PREPARATION OF URANIUM(IV) OXYSULFITE TETRAHYDRATE

Uranium (IV) oxysulfite tetrahydrate is a new composition of matter which may be readily prepared from uranium(IV) sulfite tetrahydrate by exposing the latter material to an oxygen-containing atmosphere (e.g., air). This conversion is most readily accomplished by allowing the uranium(IV) sulfite tetrahydrate to be exposed to air during the precipitation after the uranium(IV) sulfite tetrahydrate has been prepared in accordance with the general procedure set forth above. Upon filtration in air, the pale green uranium(IV) sulfite tetrahydrate turned dark gray. The dark gray product may then be washed with water and ethanol in accordance with general preparatory techniques and will result in substantially quantitative yields of the uranium(IV) oxysulfite tetrahydrate. The uranium(IV) oxysulfite tetrahydrate has been found to have the same solubility characteristics as those described above for uranium(IV) sulfite tetrahydrate.

THERMAL DECOMPOSITION OF URANIUM(IV) OXYSULFITE TETRAHYDRATE

Uranium(IV) oxysulfite tetrahydrate may be readily thermally decomposed to yield relatively pure uranium dioxide in substantially quantitative yields by heating it in an oxygen-free atmosphere (e.g., nitrogen, argon, helium, etc.) at a temperature in the range of about 400° to about 900° C., preferably 550° to 650° C. for about 30 to about 150 minutes, preferably 50 to 100 minutes.

PARTIAL DEHYDRATION OF URANIUM(IV) OXYSULFITE TETRAHYDRATE

Uranium(IV) oxysulfite tetrahydrate may be partially dehydrated to yield the dihydrate form by exposing it to a suitable dehydrating agent, e.g., phosphorus pentoxide, magnesium sulfate, silica gel, etc., at reduced pressures of about 1 to about $10^{-5}$ mm. Hg, preferably $10^{-3}$ to $10^{-2}$ mm. Hg for about 1 to about 36 hours, preferably 6 to 18 hours. After this period of time, it is noted that the solid changed from dark gray to light gray. The solubility characteristics of the resultant uranium(IV) oxysulfite dihydrate were the same as those of the uranium(IV) sulfite tetrahydrate and the uranium(IV) oxysulfite tetrahydrate. Attempts to rehydrate the uranium(IV) oxysulfite dihydrate by stirring in water resulted in a dark material similar in appearance only to uranium(IV) oxysulfite tetrahydrate.

The uranium(IV) oxysulfite dihydrate is believed to have the formula $U(OH)_2SO_3 \cdot H_2O$. However, this material is shown by Gmelin (Handbuch Der Anorganischen Chemie, 1936, eighth Edition, System No. 55, pages 145–146) as having the formula $UOSO_3 \cdot 2H_2O$. It is believed that the first formula, rather than the one postulated by Gmelin, is the correct one since the dihydrate prepared in the manner set forth above exhibited the absence of twisting vibrations arising from "free" $H_2O$ at 540 cm$^{-1}$ and also the abnormally large decrease in $H_2O$ vibrational frequencies at 1625, 1630 and 3150-3600 cm$^{-1}$. It is also significant to note that the Gmelin reference also points out that the normal salt uranium(IV) - sulfite, i.e., $U(SO_3)_2$ is known only in the following complex forms:

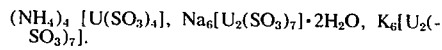

$(NH_4)_4[U(SO_3)_4]$, $Na_6[U_2(SO_3)_7] \cdot 2H_2O$, $K_6[U_2(SO_3)_7]$.

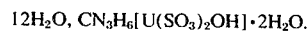

$12H_2O$, $CN_3H_6[U(SO_3)_2OH] \cdot 2H_2O$.

It is therefore surprising that the new compositions of matter, i.e., uranium(IV) sulfite and the uranium(IV) oxysulfite were found to be synthesized in their non-complexed tetrahydrate forms by the processes described above.

THERMAL DECOMPOSITION OF URANIUM(IV) OXYSULFITE DIHYDRATE

Uranium(IV) oxysulfite dihydrate may be readily thermally decomposed to yield uranium dioxide in a lower degree of purity and in less than quantitative yield than those processes which are concerned with the thermal decomposition of uranium(IV) sulfite tetrahydrate or uranium (IV) oxysulfite tetrahydrate. The uranium(IV) oxysulfite dihydrate will yield, nevertheless, uranium dioxide, by heating it in an oxygen-free atmosphere (e.g., nitrogen, argon, helium, etc.) at a temperature of about 450° to about 900° C., preferably 500° to 700° C., for about 15 to about 150 minutes, preferably 30 to 90 minutes.

The following examples serve to illustrate the novel processes and the preparation of the novel compositions of matter of this invention.

EXAMPLE 1

A solution of 3.3780 g. of sodium dithionite in 100 ml. of water was added with stirring to a solution of 3.7816 g. of UNH in 100 ml. of water. A deep red color developed immediately in the solution mixing area and rapidly gave a pale green precipitate. After addition of the dithionite solution was completed, stirring was continued for 10 minutes. The precipitate was filtered in an atmosphere of nitrogen and washed with six 50 ml. portions of water. The product was then washed with three 25 ml. portions of 95 percent ethyl alcohol and was dried by drawing nitrogen through the filter cake.

The uranium(IV) sulfite tetrahydrate had the following analysis: Calculated: U — 50.64; S — 13.62; H — 1.70. Found: U — 50.73; S — 13.66; H — 1.76. The yield of the uranium(IV) sulfite tetrahydrate was essentially quantitative.

EXAMPLE 2

A sample (0.1124 g.) of uranium(IV) sulfite tetrahydrate, prepared in the manner set forth in Example 1, was placed in a pre-heated furnace at 650° C. in a nitrogen atmosphere for 75 minutes. After cooling in the furnace under nitrogen, the sample was found to have lost 0.0475 g. or 42.26 percent of its original weight. Calculations for the loss of 4 moles of water and 2 moles of sulfur dioxide required a weight loss of 42.55 percent. The analysis of the resultant uranium dioxide is as follows: Calculated for $UO_2$:U — 88.15. Found for $UO_2$:U — 88.36; S — 0.02; Na — 0.07 percent.

EXAMPLE 3

Example 1 was repeated except that the precipitated uranium(IV) sulfite tetrahydrate was filtered in the presence of air; it was noted that as the filtration in the presence of air took place, the pale green material turned dark gray. The dark gray product was washed with six 50 ml. portions of water and three 25 ml. portions of ethyl alcohol. The product was dried by drawing air through the filter cake. The yield of the resultant uranium(IV) oxysulfite tetrahydrate was quantitative and its analysis was as follows: Calculated: U — 58.62. Found: U — 58.36.

EXAMPLE 4

A sample (7.394 mg.) of uranium(IV) oxysulfite tetrahydrate prepared in the manner set forth in Example 3 was heated to 218° C. under nitrogen in a differential thermal analysis sample holder. On cooling to 25° C., the sample was found to have lost 1.317 mg. or 17.81 percent of its original weight. Calculations for the loss of 4 moles of water from the uranium(IV) oxysulfite tetrahydrate required a weight loss of 17.73 percent.

Another sample (0.7292 g.) of the uranium(IV) oxysulfite tetrahydrate was placed in a furnace at 600° C. under a stream of nitrogen for 90 minutes. After cooling under nitrogen, the weight of the sample was 0.4841 g. This corresponded to a loss of 0.2451 g. or 33.61 percent of the original weight. Calculations for the loss of 4 moles of water and 1 mole of sulfur dioxide from the uranium(IV) oxysulfite tetrahydrate to give uranium dioxide required a loss of 33.50 percent. The analysis of the resultant uranium dioxide was as follows: Calculated for $UO_2$: U — 88.15. Found for $UO_2$: U — 87.96; S — 0.01; Na — 0.13.

EXAMPLE 5

A sample of uranium(IV) oxysulfite tetrahydrate prepared in the manner set forth in Example 3 was placed in a vacuum desiccator at a pressure of $10^{-2}$ mm. Hg over phosphorus pentoxide for 12 hours. The solid changed from a dark gray to a light gray color. The analysis for the resultant uranium(IV) oxysulfite dihydrate was as follows: Calculated: U — 64.32; S — 8.65; H — 1.08. Found: U — 64.16; S — 8.65; H — 1.15; Na — 0.36 ppm.

EXAMPLE 6

Samples of uranium(IV) oxysulfite dihydrate were thermally decomposed in an oven at 550° C. in a nitrogen atmosphere. The analytical results of the thermal decomposition reaction were somewhat inconsistent since the resultant products exhibited uranium contents that ranged from 83.33 to 86.83 percent. Sulfur analyses were consistently low for the ratio of uranium dioxide to uranium oxysulfide indicated by the uranium analyses. Even though no definite trend was determined in varying the conditions of the decomposition reaction, the results appear to indicate that slower initial heating rates give higher concentrations of uranium oxysulfide. Changes in the size of the sample and in the flow rate of the nitrogen did not appear to change the ratio of the uranium oxysulfide to uranium dioxide.

As noted above, the processes of this invention are generally applicable to the preparation of actinide dioxides, especially those of uranium, plutonium and neptunium. Although the specific details of the processes and the compositions of matter are set forth with particular reference to uranium, those skilled in the art will understand that such specific details are also applicable to the other actinides, especially plutonium and uranium.

What is claimed is:
1. A process for the preparation of an actinide dioxide comprising the steps of:
    a. reacting an actinide nitrate hexahydrate selected from the group consisting of uranyl nitrate hexahydrate, plutonyl nitrate hexahydrate and neptunyl nitrate hexahydrate with sodium dithionite to yield a sulfite containing reaction product of the corresponding actinide; and
    b. heating the reaction product resulting from step (a) in the absence of an oxygen-containing atmosphere to obtain the actinide dioxide.
2. The process of claim 1 in which the sodium dithionite is present in an amount of about 1 to about 10 moles per mole of actinide nitrate hexahydrate.
3. The process of claim 1 in which step (b) is carried out in a nitrogen atmosphere.
4. The process of claim 1 in which step (b) is carried out at a temperature of about 500° to about 950° C. for about 15 to about 135 minutes.

5. The process of claim 1 in which the actinide nitrate hexahydrate is uranyl nitrate hexahydrate and the actinide dioxide is uranium dioxide.

6. The process of claim 1 in which the reaction product obtained from step (a) is, prior to carrying out step (b), exposed to an oxygen-containing atmosphere.

7. The process of claim 6 in which the actinide nitrate hexahydrate is uranyl nitrate hexahydrate and the actinide dioxide is uranium dioxide.

8. The process of claim 6 in which step (b) is carried out in a nitrogen atmosphere.

9. The process of claim 8 in which the actinide nitrate hexahydrate is uranyl nitrate hexahydrate and the actinide dioxide is uranium dioxide.

10. The process of claim 6 in which step (b) is carried out at a temperature of about 450° to about 900° C. for about 15 to about 150 minutes.

11. The process of claim 10 in which the actinide nitrate hexahydrate is uranyl nitrate hexahydrate and the actinide dioxide is uranium dioxide.

12. The process of claim 6 in which the oxygen-containing atmosphere is air.

13. The process of claim 6 in which the reaction product exposed to the oxygen-containing atmosphere is, prior to carrying out step (b), partially dehydrated under reduced pressures.

14. The process of claim 13 in which the actinide nitrate hexahydrate is uranyl nitrate hexahydrate and the actinide dioxide is uranium dioxide.

15. The process of claim 9 in which step (b) is carried out in a nitrogen atmosphere.

16. The process of claim 9 in which step (b) is carried out at a temperature of about 450° to about 900° C. for about 15 to about 150 minutes.

* * * * *